Oct. 14, 1952 N. J. BROUWER 2,613,447
WHEEL CHECKING DEVICE
Filed Sept. 26, 1950 2 SHEETS—SHEET 1
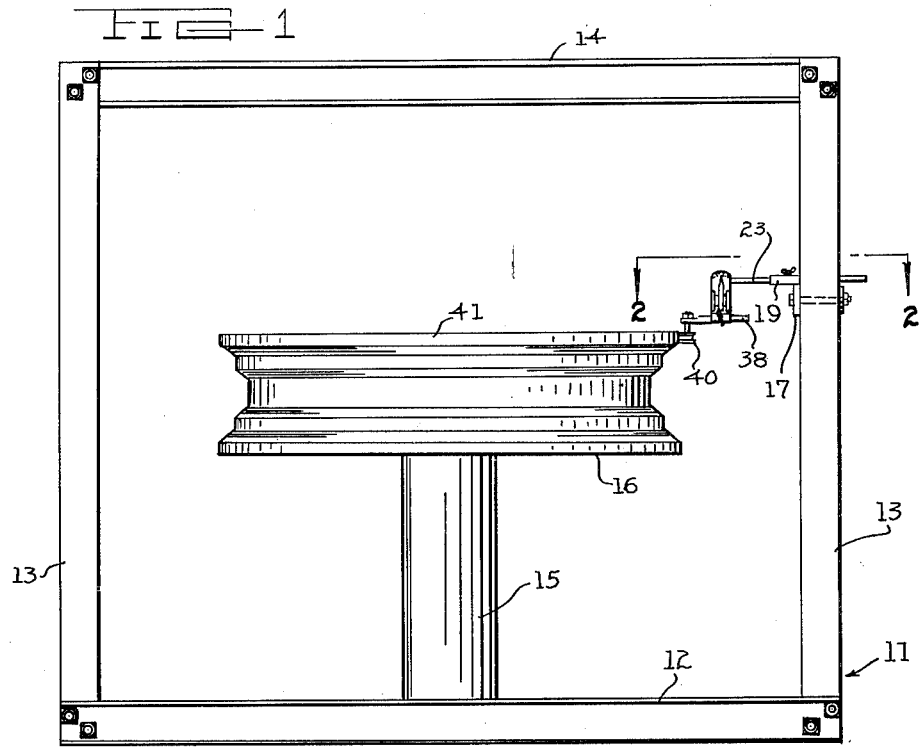
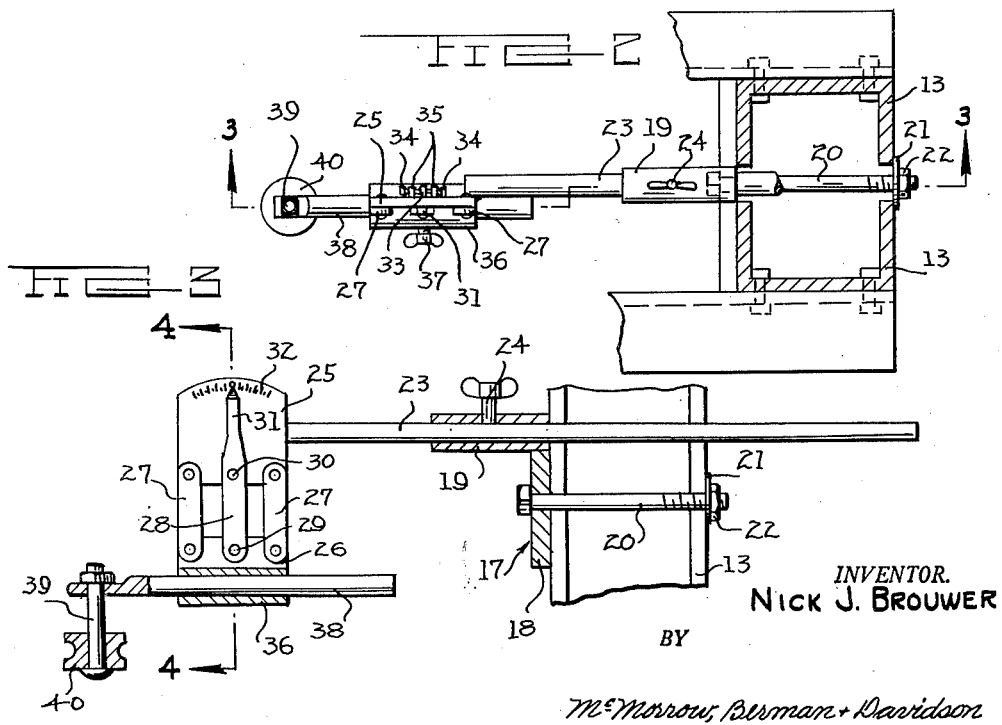
INVENTOR.
NICK J. BROUWER
BY
McMorrow, Berman + Davidson
ATTORNEYS Oct. 14, 1952          N. J. BROUWER          2,613,447
WHEEL CHECKING DEVICE
Filed Sept. 26, 1950          2 SHEETS—SHEET 2
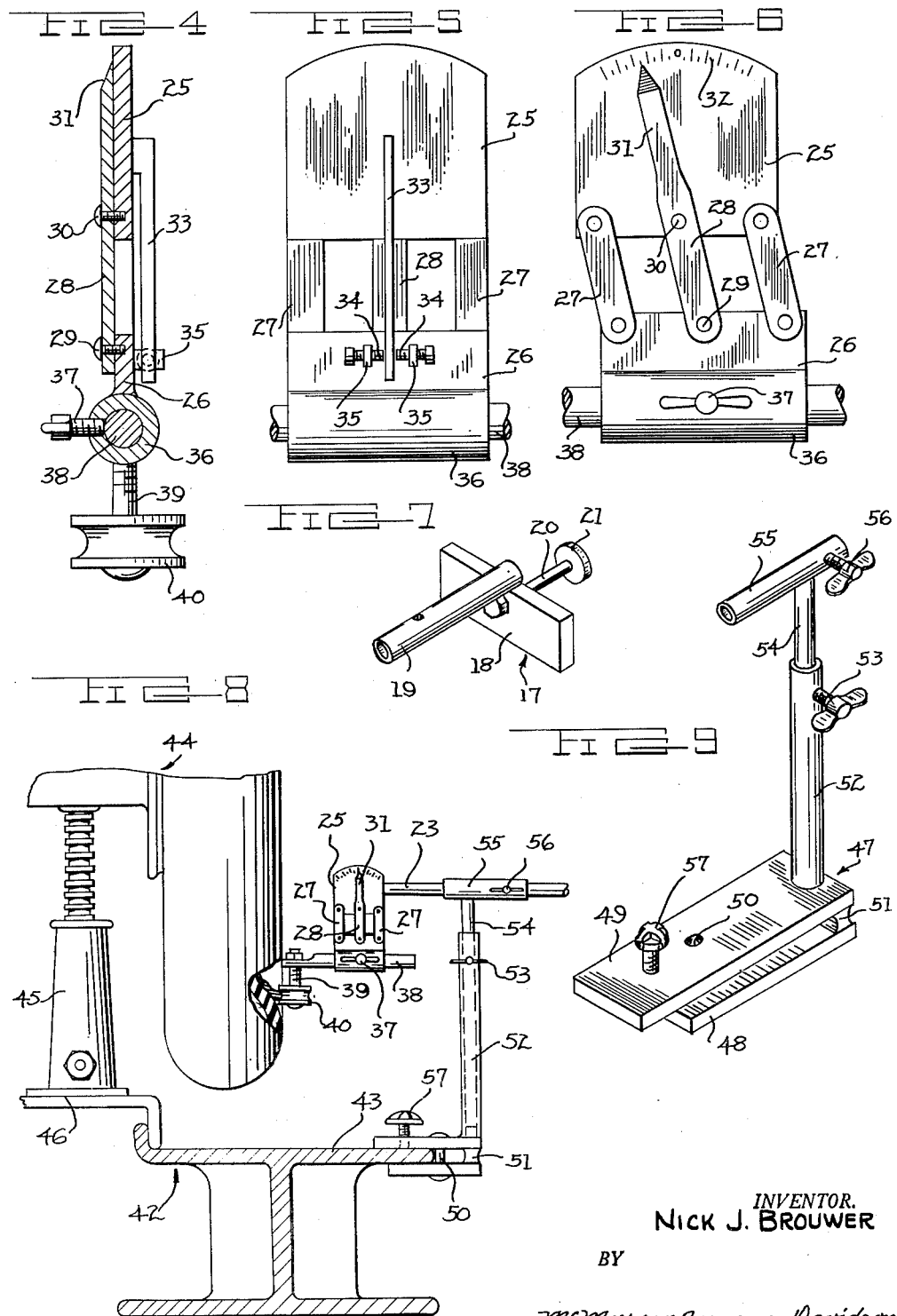
INVENTOR.
NICK J. BROUWER
BY
McMorrow, Berman & Davidson
ATTORNEYS Patented Oct. 14, 1952

2,613,447

UNITED STATES PATENT OFFICE 2,613,447

WHEEL CHECKING DEVICE

Nick J. Brouwer, Rock Valley, Iowa

Application September 26, 1950, Serial No. 186,873

2 Claims. (Cl. 33—203.16)

This invention relates to testing devices for checking the alignment of wheels, axles, brake drums, and other rotating portions of the wheel and axle assembly of an automobile, and more particularly to an indicating device for determining the degree of eccentricity of wheels, brake drums, and other rotating portions of the wheel and axle assembly of the vehicle.

A main object of the invention is to provide a novel and improved testing device for checking the alignment of wheels and other portions of the wheel and axle assembly of a vehicle, said device being very simple in construction, being easy to use, and involving relatively few parts.

A further object of the invention is to provide an improved testing device for determining the eccentricity of wheels, brake drums, axles, and other components of the wheel and axle assembly of a vehicle, said device being inexpensive to fabricate, being rugged in construction, and providing accurate indications.

Further objects and advantages of the invention will become apparent from the following description and claims, and from the accompanying drawings, wherein:

Figure 1 is an elevational view of one form of eccentricity testing device according to the present invention, shown in position for measuring the degree of eccentricity of the rim portion of a wheel;

Figure 2 is an enlarged, cross-sectional, detail view taken on line 2—2 of Figure 1;

Figure 3 is a cross-sectional, detail view taken on line 3—3 of Figure 2;

Figure 4 is an enlarged, cross-sectional, detail view taken on line 4—4 of Figure 3;

Figure 5 is an enlarged, rear, elevational, detail view of the indicating portion of the device;

Figure 6 is a front elevational view of the indicating portion of the device shown in a deflected position;

Figure 7 is a perspective, detail view of the gauge rod supporting bracket employed in the arrangement of Figure 1;

Figure 8 is a fragmentary view showing a modified form of gauge device according to the present invention positioned to measure the degree of eccentricity of the bead portion of a rear vehicle wheel;

Figure 9 is a perspective, detail view of the gauge rod supporting bracket employed in Figure 8.

Referring to the drawings, and more particularly to Figures 1 to 7, 11 designates a rectangular frame comprising bottom channels 12, vertical end channels 13, 13 secured to the ends of the bottom channels, and top channels 14 secured to the top ends of the vertical channels 13. A pair of vertical channels 13, 13 are provided at each end of the frame, the flanges thereof being inwardly turned, as shown in Figure 2, and the channels being connected in any suitable manner to provide a space between the opposing edges of the channel flanges. Designated at 15 is a vertical supporting post secured to the intermediate portions of the bottom channels 12, the top end of the post being suitably formed to rotatively mount a wheel, such as shown at 16, in horizontal position for free rotation around the axis of the post.

Designated at 17 is a bracket member, shown in Figure 7, comprising a plate 18, to the upper edge of which is rigidly secured a sleeve 19 extending perpendicular to the plate. Plate 18 is adjustably clamped transversely to the inner flanges of one set of vertical channels 13, 13 by a bolt 20 extending between the channel flanges and provided at its outer end with a washer 21 and a clamping nut 22. As shown in Figures 1 to 3, the sleeve 19 extends inwardly of the frame 11 when the bracket 17 is thus clamped.

Designated at 23 is a horizontal rod member which is adjustably secured in the sleeve 19 by a wing set screw 24 threaded into the sleeve, as shown in Figure 3. Secured to the end of rod member 23 is a plate 25. Designated at 26 is a plate swingably connected to the lower marginal portion of plate 25 by links 27, 27, the plate 26 being parallel to the plate 25 and the links 27, 27 being parallel to each other. Designated at 28 is an indicator bar pivotally connected at 29 and 30 to the plate 26 and plate 25 parallel to the links 27, 27, said pivotal connections 29 and 30 being in horizontal alignment with the respective lower and upper pivotal connections of the links 27, 27, whereby the bar 28 swings synchronously with the links. The top end of bar 28 is formed as a pointer 31, and the top marginal portion of plate 25 is inscribed with an arcuate scale 32 disposed adjacent the tip of said pointer.

As shown in Figures 4 and 5, the plate 25 has secured to its rear surface a depending arm 33 whose lower end is pivotally engaged between the inner ends of a pair of horizontal stop screws 34, 34 adjustably carried in tapped lugs 35, 35 projecting from the rear surface of plate 26.

Plate 26 is formed at its lower margin with a sleeve 36. Adjustably secured in sleeve 36 by means of a wing set screw 37 is a horizontal rod 38. Secured to the end of rod 38 is a depending vertical bolt 39. Rotatably carried on the bolt 39 is a peripherally grooved feeler roller 40.

In using the device of Figures 1 to 7, the wheel or other member to be tested for eccentricity is mounted on the post 15 in the manner shown in Figure 1, wherein a wheel 16 of the drop center rim type is shown so mounted. The bracket 17 and the rod 23 are adjusted to positions wherein the feeler roller 40 engages a peripheral portion of the member being tested, for example, the outer rim portion 41 of the wheel 16. Assuming that the roller 40 just makes contact with the portion 41 at the starting position, pointer 31 will be centered and indicate zero on scale 32. When the wheel is rotated, eccentricity of the portion contacted by roller 40 will cause the lower plate 26 to be moved horizontally, causing bar 28 to rotate around pivot 30 and providing an indication of eccentricity on scale 32 by means of pointer 31.

Referring now to Figures 8 and 9, 42 designates a conventional vehicle rack provided with longitudinal treads 43 on which a vehicle may be supported. Designated at 44 is a fragmentary portion of a vehicle rear axle housing, said housing being shown elevated by means of a suitable jack 45 supported on a cross beam 46 engaged on the treads of the rack. Designated generally at 47 is a bracket comprising spaced horizontal plates 48 and 49 connected by a rivet 50 and by a rear wall section 51. Secured to the top plate 49 at its rear margin is a vertical upstanding sleeve 52. Telescopically received in sleeve 52 and adjustably secured therein by a wing set screw 53 is a vertical rod 54 carrying a horizontal sleeve 55 at its top end. Adjustably secured in sleeve 55 by means of a wing set screw 56 is the rod 23 of an indicator assembly similar to that employed in Figures 1 to 7.

The outer edge of the tread 43 is received between the plates 48 and 49. A set screw 57 is threaded through top plate 49 and lockingly engages tread 43.

The positions of rods 23 and 54 may be adjusted so that feeler roller 40 engages any wheel element which it is desired to test for eccentricity, for example, as shown in Figure 8, the grooved portion of roller 40 may receive the outer bead of the rim of the wheel. When the wheel is rotated, eccentricity of the portion engaged by roller 40 will cause the pointer 31 to be swung along scale 32, as shown in Figure 6.

The device may be employed to check the trueness of any part of the wheel and axle assembly, such as the brake drum, axle end, wheel rim, tire, etc.

While certain specific embodiments of the testing device for checking the alignment of wheels and other rotating components of the wheel and axle assembly of a vehicle have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A wheel checking device comprising a first upstanding plate having one face provided with an arcuate scale, a rod arranged longitudinally of said plate and having one end fixed to said plate, a bracket connected to the other end of said rod and adapted to be fixedly secured to a wheel support, a second upstanding plate arranged below and in longitudinal spaced aligned relation with respect to said first plate, a pair of spaced links extending from the calibrating face of said first plate adjacent the lower end of the latter named plate to the complemental one face of the second plate adjacent the upper end of the last mentioned plate and connecting said second plate to said first plate for swinging movement relative to said first plate, a sleeve extending longitudinally of and along the lower end of said second plate and dependingly carried by the lower end of said second plate, a second rod positioned in and slidably supported in said sleeve and having one end projecting beyond said sleeve, a vertical bolt arranged contiguous to the projecting end of said second rod and having the upper end dependingly connected to the projecting end of said second rod, a feeler element rotatably supported on said bolt inwardly of the other end thereof, a securing element carried by said sleeve and engageable with said second rod for securing said second rod in position within said sleeve, and an upstanding pointer positioned intermediate and in parallel spaced relation with respect to said pair of links and connected to said first and second plates for swinging movement simultaneously with the movement of said second plate relative to said first plate, the upper end of said pointer being contiguous to and spaced from the arcuate scale of the first plate.

2. A wheel checking device comprising a first upstanding plate having one face provided with an arcuate scale, a rod arranged longitudinally of said plate and having one end fixed to said plate, a bracket connected to the other end of said rod and adapted to be fixedly secured to a wheel support, a second upstanding plate arranged below and in longitudinal spaced aligned relation with respect to said first plate, a pair of spaced links extending from the calibrated face of said first plate adjacent the lower end of the latter named plate to the complemental one face of the second plate adjacent the upper end of the last mentioned plate and connecting said second plate to said first plate for swinging movement relative to said first plate, a sleeve extending longitudinally of and along the lower end of said second plate and dependingly carried by the lower end of said second plate, a second rod positioned in and slidably supported in said sleeve and having one end projecting beyond said sleeve, a vertical bolt arranged contiguous to the projecting end of said second rod and having the upper end dependingly connected to the projecting end of said second rod, a feeler element rotatably supported on said bolt inwardly of the other end thereof, a securing element carried by said sleeve and engageable with said second rod for securing said second rod in position within said sleeve, an upstanding pointer positioned intermediate and in parallel spaced relation with respect to said pair of links and connected to said first and second plates for swinging movement simultaneously with the movement of said second plate relative to said first plate, the upper end of said pointer being contiguous to and spaced from the arcuate scale of said first plate, a vertical arm arranged adjacent the other face of said first plate and having the upper end dependingly secured to said first plate, and opposed rotatable screws on the other face of said second plate and engagingly receiving therebetween the lower end of said arm.

NICK J. BROUWER.

REFERENCES CITED

The following references are of record in the file of this patent:

UNITED STATES PATENTS

| Number | Name | Date |
|---|---|---|
| 293,768 | Munton | Feb. 19, 1884 |
| 603,782 | Brown | May 10, 1898 |
| 882,897 | Larava | Mar. 24, 1908 |
| 1,295,936 | Spellman | Mar. 4, 1919 |

FOREIGN PATENTS

| Number | Country | Date |
|---|---|---|
| 187,917 | Germany | Aug. 9, 1907 |
| 720,757 | France | Dec. 12, 1931 |